(12) United States Patent
Kelly et al.

(10) Patent No.: US 6,665,243 B2
(45) Date of Patent: Dec. 16, 2003

(54) METHOD AND APPARATUS FOR RECORDING A COMPACT DISC AT A SUB-1X SPEEDS

(75) Inventors: John Kelly, Menlo Park, CA (US); Daniel R. Salmonsen, Saratoga, CA (US)

(73) Assignee: Zoran Corporation, Sunnyvale, CA (US)

(*) Notice: Subject to any disclaimer, the term of this patent is extended or adjusted under 35 U.S.C. 154(b) by 82 days.

(21) Appl. No.: 09/833,513

(22) Filed: Apr. 11, 2001

(65) Prior Publication Data

US 2002/0150018 A1 Oct. 17, 2002

(51) Int. Cl.[7] ................................................. G11B 7/00
(52) U.S. Cl. ................... 369/47.5; 369/53.1; 369/59.11
(58) Field of Search ............... 369/47.1, 47.5, 369/47.51, 47.53, 53.1, 53.3, 59.1, 59.11, 59.12, 116

(56) References Cited

U.S. PATENT DOCUMENTS

| 5,715,228 A | * | 2/1998 | Takiguchi ................... 369/116 |
| 5,751,669 A | | 5/1998 | Shiratori |
| 5,848,045 A | | 12/1998 | Kirino et al. |
| 6,285,647 B1 | * | 9/2001 | Van Woudenberg et al. ...... 369/116 |
| 6,396,792 B1 | * | 5/2002 | Ichihara ..................... 369/116 |

OTHER PUBLICATIONS

PCT Search Report dated Jul. 23, 2002, 3 pages.

* cited by examiner

*Primary Examiner*—Muhammad Edun
(74) *Attorney, Agent, or Firm*—Blakely, Sokoloff, Taylor & Zafman LLP

(57) ABSTRACT

A method and apparatus for sub-1x recording is described. The method of writing a mark on a compact disk (CD-R) medium spinning at a slow rate comprises varying the laser power between a write power and a read power while writing the mark, such that when read, the mark is read as a single mark.

19 Claims, 5 Drawing Sheets

METHOD AND APPARATUS FOR RECORDING A COMPACT DISC AT A SUB-1X SPEEDS

FIELD OF THE INVENTION

The present invention relates to compact disc recording, and more specifically, to compact disc recording at a slow speed.

BACKGROUND

In compact disk technology, sub-1× recording, i.e. recording at a slower speed than reading speed, is used when real-time compression is used to reduce the data size for audio or video data. For example, a real time compression of audio data can result in a data rate that is as low as 1/10th of the uncompressed data. Real time video compression, such as MPEG-1 for VCD applications typically results in a 1× data rate after compression. Newer compression techniques, such as MPEG-4, can achieve even higher compression ratios. Thus, if real-time compression is used, the recording speed of the data will be below 1×.

Slower recording speeds have the advantage of reduced power consumption due to reduced rotational speed and laser power. However, for CD-R media the Orange book specifies a laser power for writing at 1× speeds (generally 1.2 to 1.4 meters/second tangential velocity of the recording head), and an equation to adjust the write power upwards for writing at higher speeds, at a multiple of the nominal velocity. However, no such equation is provided for writing speeds below 1×.

During a typical CD-R write operation, a mark is formed by switching the laser from read power to write power at the starting point of the mark, and switching back to read power at the ending point. Read power, typically an order of magnitude smaller than write power, is used to illuminate the disk between marks for tracking and focus servos. It is theoretically possible to write at sub-1× speeds by linearly reducing the write power to some low level.

The recording layer of CD-R media is optimized and tested to perform at a specified range of write speeds. Outside this range, the relationship of mark formation, write power, and writing speed becomes non-linear and unpredictable. Although for real-time data compression it is desirable to record data at speeds as slow as 0.05×(0.06 meters/second) no known CD or DVD recorder, media, or optical recording head is specified for writing at speeds less than 1×, nor is there guidance given in the Orange book.

Recording hardware, the recording head as well as the circuits that control write laser power, are designed to work for writing speeds over 1×. If sub-1× writing is attempted by simply reducing the write power, these elements may require substantial modifications. Writing at 1× power for sub-1× write speeds may damage the CD-R medium by overheating.

Therefore, a method of recording at sub-1× writing speeds without requiring substantive modifications to the recording head and laser power controls is needed.

SUMMARY OF THE INVENTION

A method and apparatus for sub-1× recording is described. The method of writing a mark on a compact disk (CD-R) medium spinning at a slow rate comprises varying the laser power between a write power and a read power while writing the mark, such that when read, the mark is read as a single mark.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for recording a compact disk at a sub-1× speed is described. During a CD-R write operation, marks are formed on the disk, by heating the area with a laser at a write power. The areas between marks, the spaces, are generally formed by turning the laser power down to a read level. In the present invention, a mark is written by rapidly switching the laser power between the nominal 1× value and a lower power multiple times. Thus, rather than writing an entire mark by having the laser at a single power level, each mark is written by multiple smaller writes. This simulates the effect of using a lower laser power, while still forming the mark at 1× power, and thus not requiring modifications to laser power control and recording head. When the disk is played back, the mark created by this method is indistinguishable from data recording in a true 1× manner. Because of the spread effect of the written data, the actual signal resembles a standard mark recorded at 1× speeds. Furthermore, this method eliminates the problems of overheating.

Figure 1:
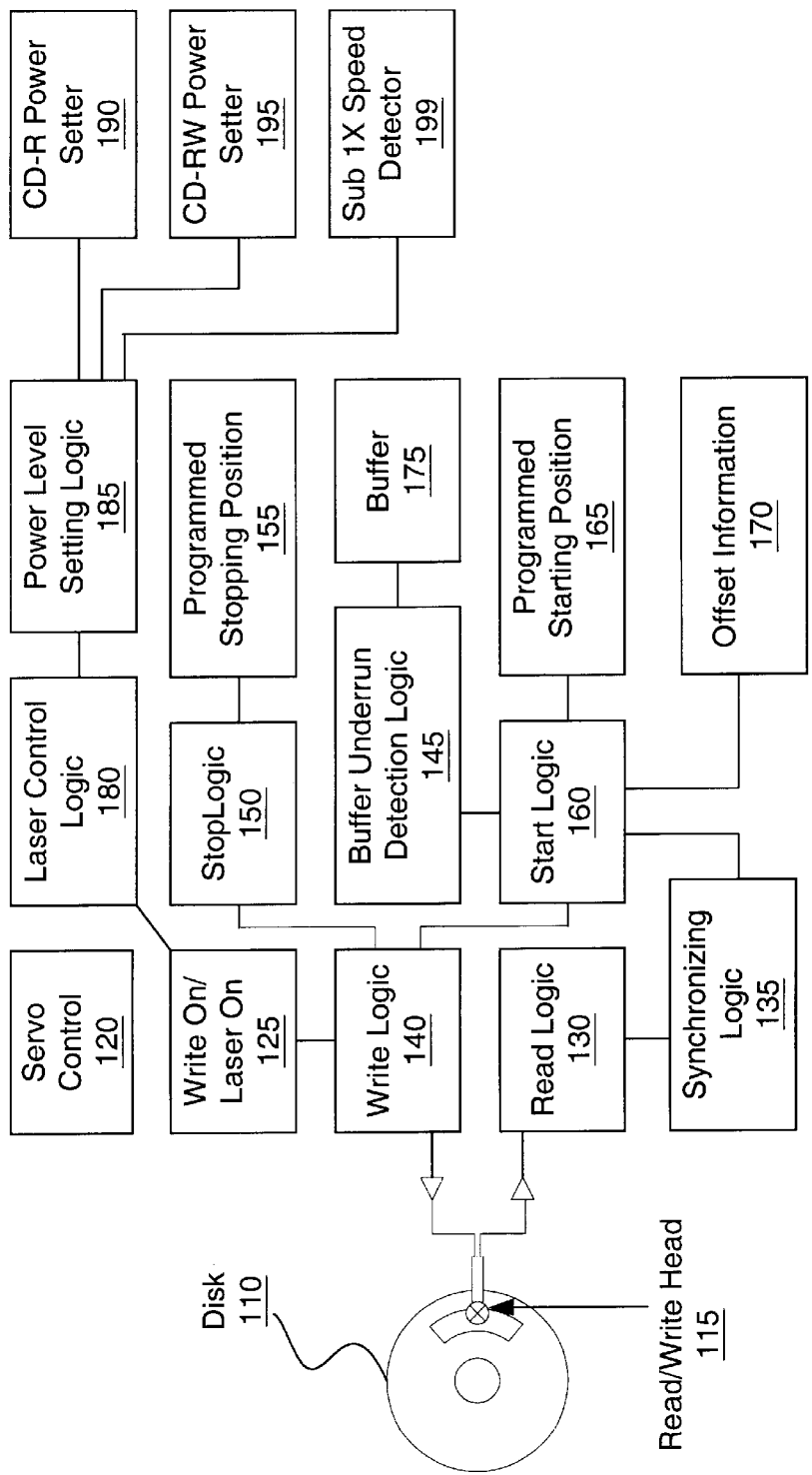
FIG. 1 is a block diagram of a compact disk recording system.

FIG. 1 is a block diagram of one embodiment of an optical writing system. The disk 110 is an optical medium that can be read and written to. For one embodiment, the disk 110 may be a compact disc, such as a CD-R, or CD-RW disk. For another embodiment, the disk 110 may be a DVD disk, or another type of optical medium.

A read/write head 115 is positioned over the disk 110. The read/write head is designed to read from and write to the disk 110. For one embodiment, the read/write head 115 may be two devices, one designed to read, and one designed to write. The read/write head includes a laser for writing to the disk 110, as is known in the art. The recording laser (not shown) is controlled by write on/laser on logic 125, which turns on the writing laser at a certain time, as will be discussed in more detail below.

The laser control logic 180 sets the power of the recording laser. The laser control logic 180 may further define the write strategy used by recording laser. The linkless writing described here permits the stopping and re-starting of the write process of an optical medium at any point during recording. The data that was written prior to the stopping point can then be read and evaluated for various characteristics. For example, the characteristics may include symmetry, error rate, jitter, or other metrics that are used to evaluate the quality of the read-back signal. The quality of the data being read indicates whether the write power and write strategy are correct. This evaluation may be done at an arbitrary time and place, and for an arbitrarily large number of frames. The laser control logic 180 can then adjust the power and signal being written, to produce a better quality read-back signal. The laser control logic 180 is described in more detail in co-pending application Ser. No. 09/818,055, entitled "An Improved And Control Apparatus for laser Power During Recording", filed Mar. 26, 2001.

Servo control 120 controls the mechanical aspects of the movement of the disk 110 and read/write head 115, as is known in the art.

Write logic 140 writes data to disk 110. Write logic 140 receives data from small buffer (not shown), and after encoding the data, writes the data to disk 110. Write logic 140 is described in more detail in FIGS. 1A and 1B below.

Write logic 140 is controlled by start logic 160 and stop logic 150. Start logic 160 controls when write logic 140 starts to write, while stop logic 150 controls when write logic 140 stops writing.

Buffer underrun detection logic 145 detects when large buffer 175 is running low on data. Generally, buffer 175 is continuously filled. When the buffer underrun, the buffer underrun detection logic 145 detects that buffer 175 is running low, and may have a buffer underrun, the buffer underrun detection logic 145 passes this information to the stop logic 150, indicating that the stop logic 150 should stop the recording. The stop logic 150 determines when to stop the recording based on the programmed stopping position 155, which is stored in a register. For one embodiment, stop logic 150 stops the recording in the small frame after the buffer underrun detection logic 145 indicates that there is going to be a buffer underrun, at the location indicated by the programmed stopping position.

At the appropriate time, the stop logic 150 indicates to the write logic 140 that writing should be stopped. At that time, the write on/laser on logic 125 turns off or deflects the writing laser.

At a later time, the buffer underrun detection logic 140 may determine that the buffer 175 is sufficiently full that that recording should be restarted, and notify start logic 160. For another embodiment, another signal may indicate that it is time to restart recording. For example, the user may indicate that it is time to restart recording, directly to start logic 160.

Start logic 160 uses read logic 130 to derive a synchronization signal, to synchronize the about-to-be recorded data to the previously recorded data.

Start logic 160 determines the starting location based on the programmed starting position 165 and the offset information 170. The offset information 170 is determined based on a distance from the read/write head 115 to the read logic 130, and the time the read logic 130 takes to identify the data being read. The offset information 170 compensates for the time between when an area is actually under the read/write head 115 and when the read logic 130 identifies the information. For one embodiment, the offset information 170 is programmed by the OEM (original equipment manufacturer) who indicates the distance between the read/write head 115 and the read logic 130, while the system determines the time for the read logic 130 to identify the information.

The start logic 160 then uses the synchronizing data from synchronizing logic 135 to start writing new data, using write logic 140. In this way, the system can stop writing data to disk 110, and restart writing data, at pre-programmed points. The linkless restart mechanism described above is described in more detail in co-pending application Ser. No. 09/649,313, entitled "Method And Apparatus for Compact Disc Encoder Write-Start," filed Aug. 28, 2000.

Although the above system illustrates one link-less restart mechanism, alternative restart mechanisms may be used. In that instance, start and stop logic, as well as programmed starting and stopping positions, and offset information may be eliminated. For example, an alternative mechanism may start and stop at the same location, or determine its starting position in some other way. In yet another embodiment, the laser control logic 180 as well as the linkless restart mechanism may be eliminated entirely.

Power level setting logic 185 sets the writing power used by read/write head 115. Power level setting logic 185 has as an input CD-R power setter 190 and CD-RW power setter 195. As is known in the art, the power levels used for CD-R and CD-RW format writing are different, since the materials of the disks are different. Generally, CD-R is written by writing marks onto the disk surface, by holding the laser at a writing level, as the disk spins. CD-RW, on the other hand, is generally written by writing marks onto the surface by melting and remelting the surface with multiple pulses to write each mark. The power levels and timings used for each are set by CD-R power setter 190 and CD-RW power setter 195 respectively.

The sub-1× speed detector 199 determines what the writing speed is. For one embodiment, the sub-1× speed detector 199 monitors the speed of the disk 110 as set by the servo control 120. When the speed is at sub-1× a different writing strategy is used for CD-R disks. The sub-1× speed detector 199 triggers the alternative writing strategy.

Figure 2:
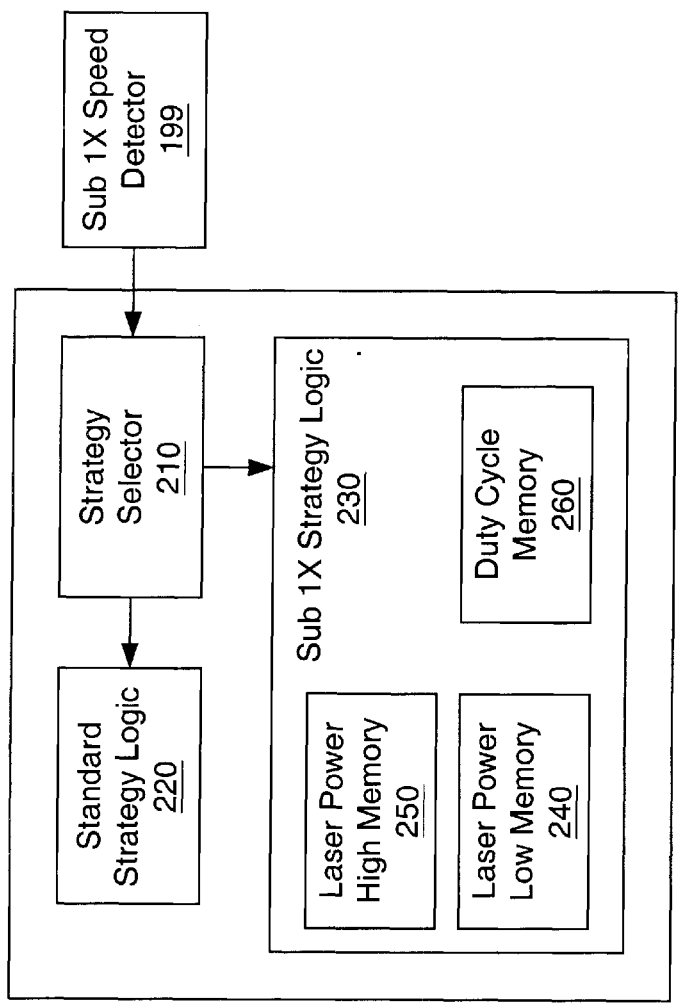
FIG. 2 is a more detailed block diagram of a timing logic in the recording system.

FIG. 2 illustrates the elements of the sub-1× speed detector 199, CD-R power setter 190, and power level setting logic 185 in more detail. Power setter 190 includes strategy selector 210, which receives as an input data from the sub-1× speed detector 199, indicating whether the speed is below 1× or not. The strategy selector 210 then selects the strategy either from standard strategy 220 or from sub-1× strategy logic 230. The standard strategy for writing CD-R is known in the art, and need not be discussed in detail. Any strategy not addressing sub-1× writing may be implemented using standard strategy logic 220.

The sub-1× strategy logic 230 includes a laser power high memory 250, to select the high power level for the laser, as well as a laser power low memory 240, to select the low power level. For one embodiment, the high power level is the standard 1× writing level, while the low power level 240 is the read power level. For another embodiment, alternative power levels may be used. For one embodiment, the power high level is not decreased below 1× level, since generally the equipment is not adjustable to lower levels. Alternatively, the power high level may be adjusted to below 1× levels. For one embodiment, the power low level may be as low as no power (i.e. laser off) or may be merely slightly lower than the power high level. By modulating between the power high level and the power low level during the writing of each mark, the effect of using a lower power level is simulated, while being able to use standard power levels.

The sub-1× strategy logic 230 further includes duty cycle memory 260, which sets the duty cycle, the speed of switching between high power and low power. For one embodiment, the duty cycle is 50%, i.e. the laser is at the high level 50% of the time, and at the low level the remaining 50% of the time. However, duty cycle may vary anywhere between 99% and 1%. The duty cycle is selected based on the ability of a mark written with that duty cycle to be read as a single mark, rather than a plurality of marks. Because of the spreading effect of written data, the mark written will form a single continuous mark, if the power levels and duty cycle are selected correctly. At sub-1 speeds, because of the slow rotation of the disk, the spread-out is increased, because each point is heated for a longer period of time than at a higher rotation speed. The duty cycle is limited by the range of operation of the switching and timing function of the recorder being used. Generally, the duty cycle should not be chosen near the switching/timing limits of the device. However, because of the slow rotation of the disk, there should be no problem switching laser power multiple times during the writing of a mark.

For one embodiment, the elements described as being part of the sub-1× strategy logic 230 overlap with the CD-RW logics. For one embodiment, CD-RW write strategy is used for the sub-1 writing strategy, with a modified clock speed. The conventional methods of optimum power control and automatic laser power control remain unchanged. Using this strategy requires no changes to the optical head or other parts of the drive hardware. The disk is written with the instantaneous nominal power for which it is designed.

For one embodiment, the testing logics described above may be used to adjust the high and low laser powers as well as the duty cycle. For one embodiment, the sub-1× strategy logic 230 may receive the analysis of the testing logic, and adjust these values accordingly.

Figure 3:
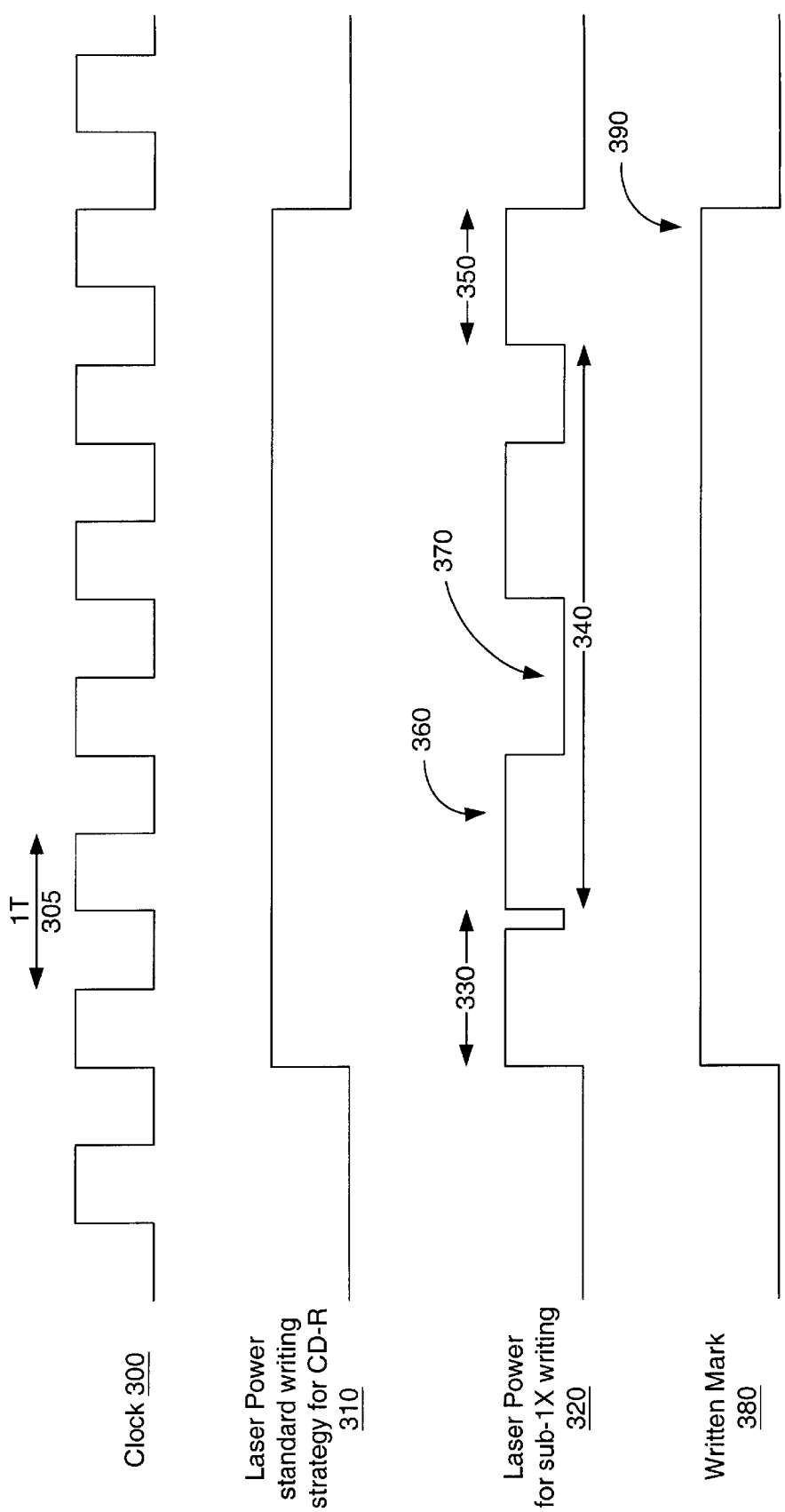
FIG. 3 is a timing diagram illustrating the writing method in accordance with the present invention.

FIG. 3 is a timing diagram illustrating the writing method in accordance with the present invention. The clock signal 300 is used to time actions. The normal laser power for CD-R 310 is illustrated as the standard methodology for writing. The normal laser power for CD-R 310 writes a mark by continuously holding the laser power high for the entire duration of the mark.

The laser power at a sub-1× writing speed 320, on the other hand, is modulated between a high level 360 and a low level 370 during the writing of the single mark 390. For one embodiment, the writing 320 has three portions, the starting portion 330, and the body 330, and the ending portion 340. The starting portion 330 starts by writing at the high level 360, for a period of time. Since laser power-up is not instantaneous, this period may be longer than the standard duty cycle of the write. During the body 330 of the write, the laser power is modulated between the high 360 and low 370 levels in accordance with the duty cycle defined for this write. At the ending portion 340, the write may be abbreviated or extended, such that the end of the high power level write coincides with the end of the mark. For another embodiment, the entire mark may be written using the body writing style, without accounting for ending and beginning periods. For yet another embodiment, the system may account only for the end, or only for the beginning period. The signal that is written as a result of the modulated write 320 is a single mark, which is read by any standard compact disk reader as a single mark. In this way, the laser need not be adjusted for writing at a sub-1× speed.

Figure 5:
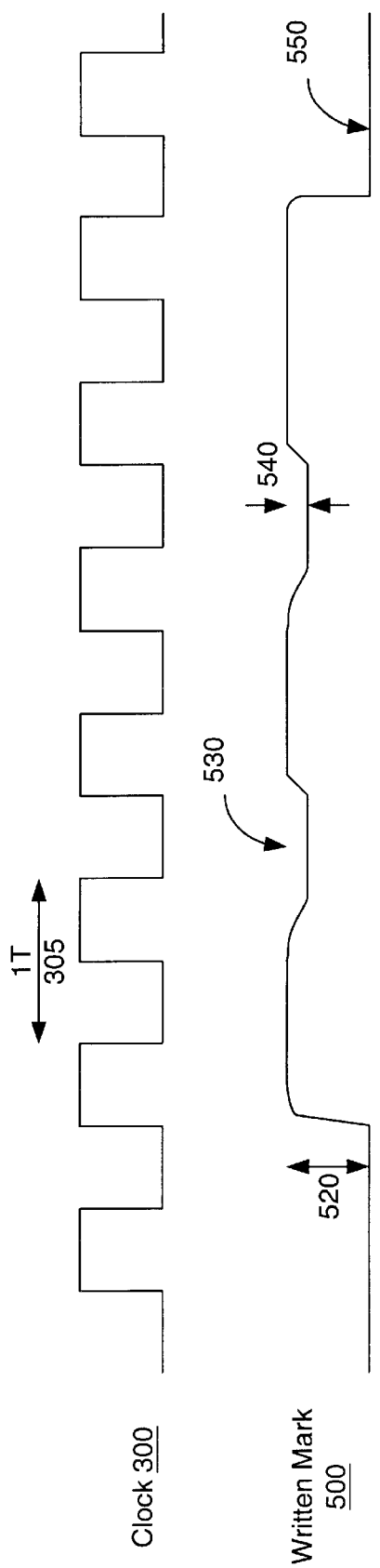
FIG. 5 is an illustration of an actual mark made in accordance with the present system.

FIG. 5 illustrates an actual mark 500, written using the above strategy. As can be seen, even the areas 530 of the mark which are below the full height 520 of a standard mark are well above the height of a space 550. Thus, a device reading the mark 500 would not detect the change in height 540, but would rather see the entire mark as a single raised mark.

Figure 4:
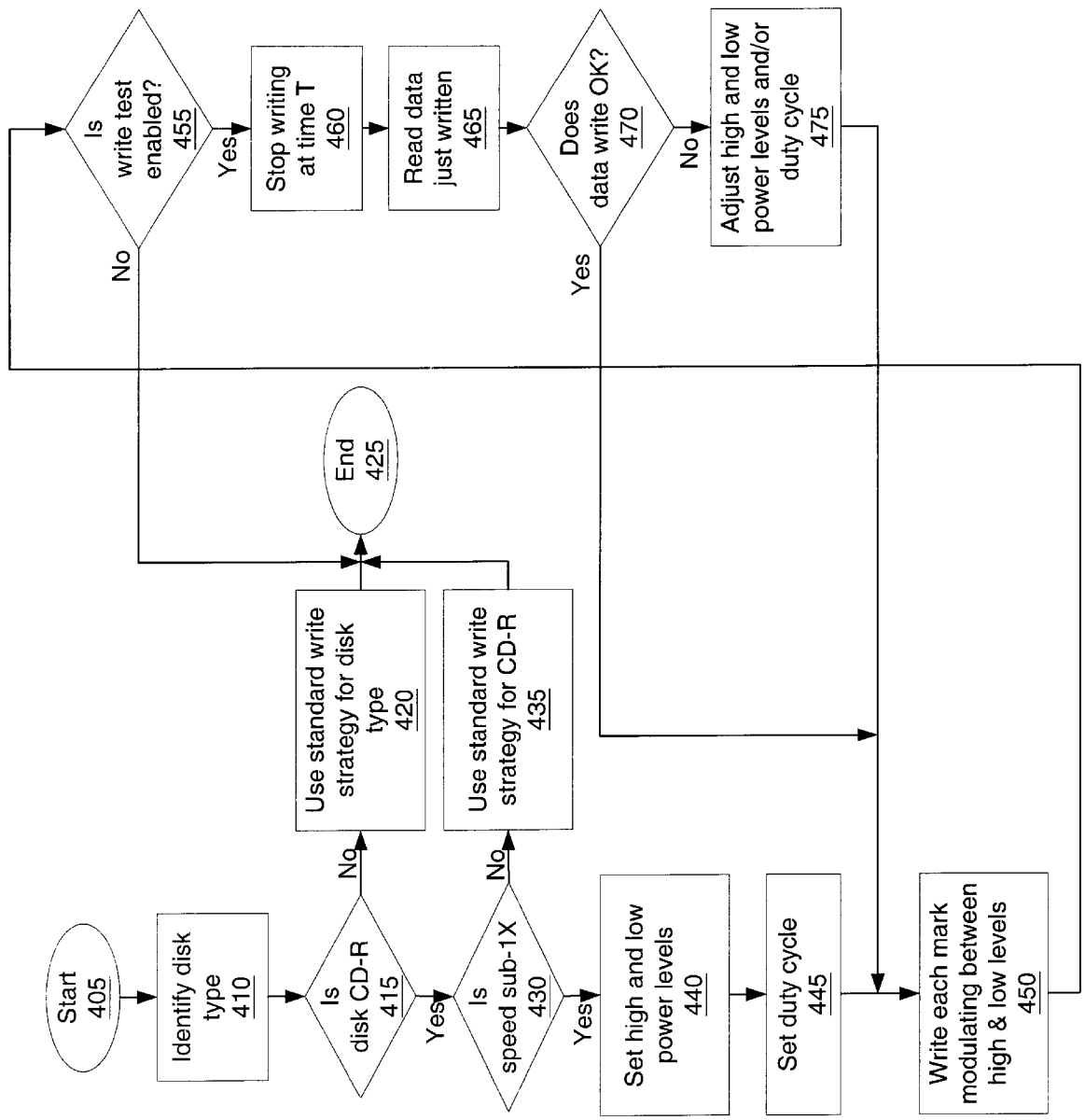
FIG. 4 is a flowchart of one embodiment of implementing the present system.

FIG. 4 is a flowchart of one embodiment of implementing the present system. The process starts at block 405, when the writing is initiated. At block 410, the disk type is identified. For one embodiment, this may be set by the user. Alternatively, the system may detect the disk type based on known quantities/values. This is a process known in the art.

At block 415, the process determines whether the disk is a CD-R disk. In general, there are multiple types of disks that may be used for recording. The CD-R, or CD-Recordable disk format is a write once read many times format, in which data once recorded cannot be erased. The CD-RW, or CD-Read Write disk format permits the disk to be written to and erased multiple times. Other formats may also exist.

If the disk is determined to be a non-CD-R disk, the process continues to block 420. At block 420, the standard write strategy for the type of disk detected is used. The process then ends at block 425.

If the disk is determined to be a CD-R type disk, the process continues to block 430. At block 430, the process determines whether the recording speed is a sub-1× recording speed. If the recording speed is not sub-1×, the process continues to block 430. At block 430, the standard write strategy for CD-R is used. As discussed above, the standard write strategy raises the laser power to a write level appropriate for the disk speed, for the period of the mark. In this way, marks are written. The process then ends at block 425.

If, at block 430, it was determined that the recording was at a sub-1× speed, the process continued to block 440. At block 440, the high and low power levels are set for the writing, and at block 445 the duty cycle is selected. The sub-1× writing uses a modulated power, as described above. For one embodiment, the power levels and duty cycle are based on a speed of rotation. For one embodiment, the sub-1× strategy logic described above selects an appropriate power level and duty cycle to write marks which are read as single marks despite the modulation, and for which the power levels are maintained sufficiently low to prevent overheating of the disk.

At block 450, each mark, as dictated by the data being written, is written using the laser level modulation. For one embodiment, only marks longer than a minimum length are written in this way, while short marks are written using conventional CD-R write strategy.

At block 455, the process determines whether write testing is enabled. Write testing uses the linkless restart mechanism described in co-pending application Ser. No. 09/649,313, and the testing mechanism described in co-pending application Ser. No. 09/818,055. Both of these applications are hereby incorporated by reference. If write testing is not enabled, or not available in the system, the process writes each mark as described above, and ends when no more data is to be written or the disk is full, at block 425. If write testing is enabled, the process continues to block 460.

At block 460, the process stops, at a certain point. For one embodiment, the process stops a period T after writing is initiated, to test the process. For one embodiment, the process stops periodically thereafter. For yet another embodiment, the process stops at certain preset stopping points. The mechanism for stopping recording is described in co-pending application Ser. No. 09/649,313.

At block 465, the data that has just been recorded, with the high and low power levels and duty cycles set above at blocks 440 and 445 is read.

At block 470, the system evaluates whether the marks are properly read as single marks despite the modulation. Furthermore, the system may determine whether the spreading effect is too great, or there are other artifacts of using too high power levels/duty cycles. If the marks are properly read, the process returns to block 450, to write each mark with the same power levels and duty cycle. If the marks are not properly read, the process continues to block 475.

At block 475, the power levels and/or duty cycle is adjusted to correct the errors detected by reading the data.

The process then continues to block 450, to write the next set of marks with the new power levels/duty cycle. In this way, the process determines whether this specialized write strategy is appropriate, and implements it. This writing strategy permits the system to use existing settings, without necessitating modifications to the laser or write head for lower power use. Furthermore, because this implementation may, for one embodiment, use the existing CD-RW recording methodology, a current drive may be adapted to use this method with simply a firmware upgrade. This would permit the above method to be added to existing drives, enhancing the value of those drives, without requiring the purchase of a new drive. For new drives, the addition of this ability does not necessitate any redesign in hardware, which is expensive and time consuming.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of writing a mark on a compact disk (CD-R) medium spinning at a sub-1× rate comprising:
    determining an actual speed of the compact disk;
    setting the high power level, the low power level, and a duty cycle for variation of the power level for the write;
    varying the laser power between the high power level and the low power level while writing the mark, such that the mark is read as a single mark.

2. The method of claim 1, wherein a CD-RW methodology is used to vary the laser power.

3. The method of claim 1, further comprising maintaining the laser power at the high power for less than 500 ns during the write.

4. The method of claim 1, wherein the high power level is a 1× write power level.

5. The method of claim 1, wherein the low power level is a read level.

6. The method of claim 1, further comprising:
    setting the high power level to a 1× write level, and adjusting the low power level and the duty cycle to form a unitary mark.

7. The method of claim 1, further comprising:
    stopping recording after a plurality of marks have been recorded;
    reading at least a subset of the plurality of marks; and
    adjusting the high and the low power levels if the reading indicates that adjustment is necessary.

8. The method of claim 7, further comprising linklessly restarting the write operation.

9. A compact disk drive to write a mark on a compact disk (CD-R) medium spinning at a sub-1× rate comprising:
    a speed detector to determine an actual speed of the compact disk;
    a sub-1× strategy logic to set the high power level, the low power level, and a duty cycle for variation of the power level for the write; and
    a power level setting logic to vary the laser power between the first power level and the second lower power level while writing the mark, such that the mark is read as a single mark.

10. The drive of claim 9, wherein a CD-RW methodology is used to vary the laser power.

11. The drive of claim 9, wherein the laser power is maintained at the first power for less than 500 ns during the write.

12. The drive of claim 9, wherein the first power level is a 1× write power level.

13. The drive of claim 9, wherein the second power level is a read level.

14. The drive of claim 9, wherein the sub-1× strategy logic is further to set the high power level to a 1× write level, and to adjust the low power level and duty cycle to form a unitary mark.

15. The drive of claim 9, further comprising:
    a stop logic to stop recording after a plurality of marks have been recorded;
    a read logic to read at least a subset of the plurality of marks; and
    a laser control logic to determine if adjustment is needed; and
    the sub-1× strategy logic further to adjust the high and the low power levels if the laser control logic indicates that adjustment is necessary.

16. The drive of claim 15, comprising the start logic further to linklessly restart the write operation.

17. A system to write at sub-1× speeds to a compact disk (CD-R), the system comprising:
    a power level setting logic to set a writing strategy that modulates laser power between a high level and a low level while each mark is written, the modulated writing forming a single mark; and
    a laser control logic to evaluate a plurality of marks written using the writing strategy, and further to adjust the laser power if the plurality of marks indicate that adjustment is needed.

18. The system of claim 17, wherein the high power level, the low power level, and a duty cycle are set based on an actual speed of the compact disk.

19. The system of claim 17, wherein the high level is a 1× write power level and the low power level is a read level.

* * * * *